M. J. BARCALO.
Grain Separator.
No. 1,554. Reissued Oct. 27, 1863.
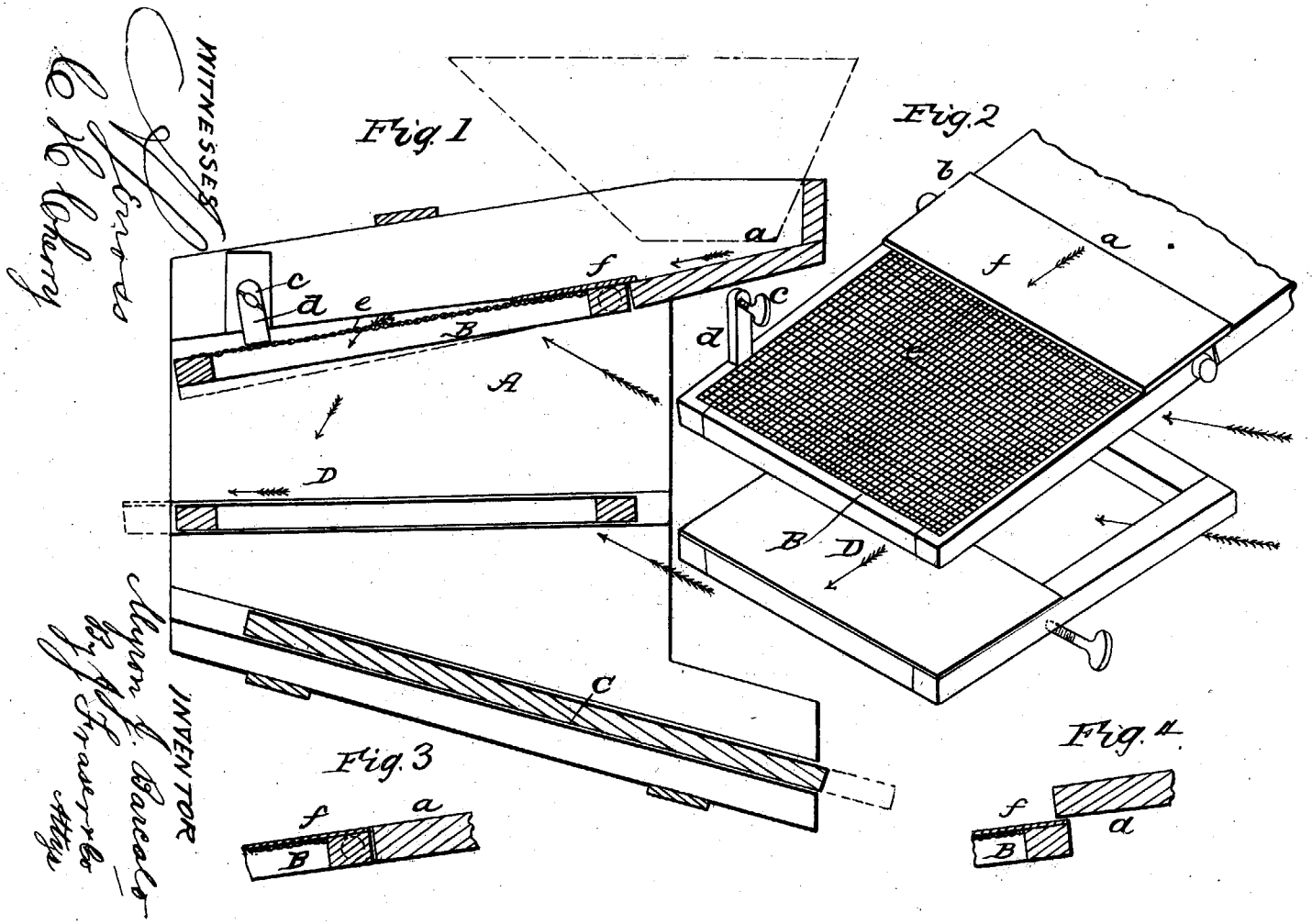
N. PETERS. Photo-Lithographer, Washington, D. C.

UNITED STATES PATENT OFFICE.

MYRON J. BARCALO, OF TUSCARORA, NEW YORK.

IMPROVEMENT IN GRAIN-SEPARATORS.

Specification forming part of Letters Patent No. 38,937, dated June 23, 1863; Reissue No. 1,554, dated October 27, 1863.

*To all whom it may concern:*

Be it known that I, MYRON J. BARCALO, of Tuscarora, in the county of Livingston and State of New York, did invent certain new and useful Improvements in Fanning-Mills and Grain-Seperators, for which Letters Patent of the United States were granted to me on the 23d day of June, 1863; and I do hereby declare that the following is a full and exact description thereof, reference being had to the accompanying drawings, making part of this specification.

Figure 1 is a central longitudinal vertical section of the shoe of a fanning-mill with my improvements applied thereto; Fig. 2, a perspective view of the screen and separating-plate, showing their arrangement and relative position; Figs. 3 and 4, views showing the relative position of the screen-plate and the chute.

Like letters of reference indicate corresponding parts in both figures.

My invention consists in the combination of a metallic plate or its equivalent, with an ordinary mesh-screen, so arranged that the rough edges of the wire are covered to prevent the clogging of the grain in its passage from the chute and the mass is carried to a proper position to receive the blast before passing through the meshes, and, furthermore, in the employment of a separating-plate in connection with a screen, in such a manner as to catch oats and such impurities as are necessary to be removed from the pure grain.

As represented in the drawings, an ordinary shoe, A, is employed, provided with a chute, *a*, which receives the uncleaned mass from an ordinary hopper. (Indicated in red lines.) From this chute the grain passes on to a screen, B, which consists of a frame covered by ordinary wire-cloth *e*. I prefer to provide the upper end of the screen with bearings *b b*, which turn in the opposite sides of the shoe, and to have the lower end adjustable vertically by means of a projection, *d*, and set-screw *c*; but, if desirable, the screen may be non-adjustable and slide in gains in the usual manner. Across the upper end of the screen I secure a metallic plate, *f*, projecting downward over the opening inclosed by the frame of the screen to any degree that it may be necessary or desirable. I prefer to employ zinc for this purpose, from its smoothness and non-corrosive qualities; but any equivalent that will produce the same result may be used.

In the principal figures of the drawings the plate *f* is represented as projecting over the chute; but it is apparent that it may abut as in Fig. 3, instead of projecting, or slide in the gains beneath the chute, as in Fig. 4, with the same effect. Indeed, the latter arrangement is the most convenient in adapting my improvement to ordinary fanning-mills.

There are several distinct advantages resulting from this combination of the plate and screen.

First. The rough edge of the wire next the chute forming the covering of the screen is covered by the plate in such a manner that the material passes smoothly and unimpeded from the chute to the meshes. In ordinary screens, in which the edge of the wire is exposed, the impediment has a tendency to check the passage of the material, and it consequently chokes or clogs. This difficulty is more serious from the fact that such impediment disturbs the natural assortment of the grain, which is accomplished by the agitation of the shoe, the heavier grain settling to the bottom while the lighter, as well as the refuse, rests on top. If it strikes the edge of the wire, it becomes remixed, and of course is not in so good condition to be subjected to the blast.

Second. By the plate *f* projecting downward sufficiently over the opening inclosed by the frame of the screen, the material does not reach the meshes till it is in the proper position to receive the blast, whose direction is indicated by the red arrows. The downward projection of the cross-piece of the screen-frame is such as to break the angular blast from the first meshes adjacent thereto; and as ordinarily arranged much of the chaff, as well as fine seeds and blighted grains, passes through the meshes before it can reach the blast, and consequently falls with the sound grain. In my arrangement the whole is carried over the plate till it comes at such a position that it will receive the full strength of the blast, and at this point, all chaff and light matter are buoyed up by the current. This result is of much consequence.

Third. In the passage of the grain over the surface of the plate, oats, barley, and other long grain that may be mingled therewith become laid lengthwise, and in this condition pass easily over the meshes, being buoyed up by the blast. The value of the plate covering the rough edge of the screen-wire is apparent in this connection, for were it not for this the oats would become disturbed again in coming in contact with it.

This arrangement of the screen and plate differs essentially from the perforated plates of zinc with a blank edge that are sometimes used in grain-separators. The latter are adapted only to cleaning grain after it has been once winnowed, and when used it is necessary that they should be used in a gang to act thoroughly. My device is intended for winnowing and cleaning grain at one and the same operation, and the screen to be of such form and condition as to be adapted to any ordinary use in fanning-mills or for cleaning any kind of grain.

As the grain passes over the meshes of the screen, it is manifest that the sound and heavy portion will pass through first, and then the blighted grains and foreign seeds. These latter commence to fall through the screen before the material reaches its lower end, and unless some disposition is made will fall down and be discharged with the pure product. To remedy this difficulty I employ below the screen a zinc separating-plate, D, or its equivalent, projecting inward a suitable distance to catch the blighted grains and seeds, and conduct them backward and discharge them outside the machine. This separating-plate may be either adjustable or stationary, as may be desired. In the drawings it is represented as situated at considerable distance below the screen; but it is obvious that it may be placed nearer to it or even in contact with its under side and still produce the same substantial result—viz., catch and conduct the impure grain backward. By the employment of this device, in connection with that before described, I am enabled to produce a very thorough separation of grain by a single action which is essential in the preparation of seed-wheat.

It will be seen that the separating-plate D must incline in the same direction as the screen, or at least must not incline in the opposite direction, or the seed will not be discharged properly.

Beneath the screen and separating-plate is a discharge-board, C, for the discharge of the pure grain.

The value of my improvement will be apparent when the necessity of pure seed-grains is considered and the small expense with which any ordinary fanning-mill may be provided with it.

I am aware that perforated metallic plates with a blank edge have before been used for separating grain; but such I do not claim, nor do I claim, broadly, the separating-plate D.

What I claim as my invention, and desire to secure by Letters Patent, is—

1. The combination of the plate *f* with the open-mesh screen B, arranged and operating substantially as and for the purposes herein set forth.

2. In combination with a screen, B, provided with the plate *f*, the separating-plate D, for the purpose of catching and discharging the foreign seed, substantially as described.

In witness whereof I have hereunto signed my name in the presence of two subscribing witnesses.

MYRON J. BARCALO.

Witnesses:

T. J. GAMBLE,

JOEL B. BARCALO.